US012240263B2

(12) United States Patent
Teufel et al.

(10) Patent No.: US 12,240,263 B2
(45) Date of Patent: Mar. 4, 2025

(54) SECURITY ELEMENT TRANSFER MATERIAL FOR TRANSFER, IN GOOD REGISTER, OF SECURITY ELEMENTS TO VALUE DOCUMENTS

(71) Applicant: GIESECKE+DEVRIENT CURRENCY TECHNOLOGY GMBH, Munich (DE)

(72) Inventors: Bjorn Teufel, Weissach (DE); Josef Schinabeck, Kreuth (DE); Giselher Dorff, Holzkirchen (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 18/245,779

(22) PCT Filed: Aug. 27, 2021

(86) PCT No.: PCT/EP2021/025325
§ 371 (c)(1),
(2) Date: Mar. 17, 2023

(87) PCT Pub. No.: WO2022/058042
PCT Pub. Date: Mar. 24, 2022

(65) Prior Publication Data

US 2024/0025200 A1 Jan. 25, 2024

(30) Foreign Application Priority Data

Sep. 21, 2020 (DE) ..................... 10 2020 005 769.1

(51) Int. Cl.
*B42D 25/46* (2014.01)
*B42D 25/00* (2014.01)
(Continued)

(52) U.S. Cl.
CPC ............. *B42D 25/46* (2014.10); *B42D 25/29* (2014.10); *B42D 25/455* (2014.10); *B42D 25/47* (2014.10); *B42D 25/328* (2014.10)

(58) Field of Classification Search
CPC .............................. B42D 25/46; B42D 25/475
See application file for complete search history.

(56) References Cited

U.S. PATENT DOCUMENTS

| | | | |
|---|---|---|---|
| 5,801,857 | A | 9/1998 | Heckenkamp et al. |
| 6,337,752 | B1 | 1/2002 | Heckenkamp et al. |

(Continued)

FOREIGN PATENT DOCUMENTS

| | | | |
|---|---|---|---|
| DE | 19940790 | A1 | 3/2001 |
| DE | 102018112652 | A1 | 11/2019 |

(Continued)

OTHER PUBLICATIONS

International Search Report from corresponding PCT Application No. PCT/EP2021/025325, Dec. 9, 2021.

*Primary Examiner* — Kyle R Grabowski
(74) *Attorney, Agent, or Firm* — Workman Nydegger

(57) ABSTRACT

A method for manufacturing the security element transfer material, a method for the register-accurate transfer of security elements from the security element transfer material to a value document substrate, and a value document which was equipped with a security element while employing the security element transfer material, wherein the security element transfer material has a temporary carrier material and a plurality of security elements and a plurality of register mark elements which are arranged on a main area of the temporary carrier material and have a layered composite structure. Each register mark element represents a register mark or contains a register mark, and each register mark is assigned to at least one security element. Apart from the
(Continued)

security elements and the register mark elements, the temporary carrier material is free from layered composite material.

17 Claims, 7 Drawing Sheets

(51) Int. Cl.

| | |
|---|---|
| ***B42D 25/29*** | (2014.01) |
| ***B42D 25/455*** | (2014.01) |
| ***B42D 25/47*** | (2014.01) |
| *B42D 25/328* | (2014.01) |

(56) References Cited

U.S. PATENT DOCUMENTS

| | | | | |
|---|---|---|---|---|
| 6,808,792 | B1 | 10/2004 | Weber | |
| 6,954,293 | B2 | 10/2005 | Heckenkamp et al. | |
| 9,321,294 | B2 * | 4/2016 | Scheuer | G09F 3/0291 |
| 11,124,011 | B2 | 9/2021 | Cathomen et al. | |
| 2002/0018430 | A1 | 2/2002 | Heckenkamp et al. | |
| 2008/0261130 | A1 * | 10/2008 | Hammond-Smith | B42D 25/41 430/20 |
| 2009/0250158 | A1 | 10/2009 | Streb et al. | |
| 2017/0267013 | A1 * | 9/2017 | Staub | B42D 25/29 |
| 2019/0001735 | A1 | 1/2019 | Cathomen et al. | |
| 2021/0197612 | A1 * | 7/2021 | Hoffmann | B42D 25/455 |
| 2022/0055363 | A1 * | 2/2022 | Arnold | B32B 7/14 |

FOREIGN PATENT DOCUMENTS

| | | | | | |
|---|---|---|---|---|---|
| EP | 0420261 | B1 | | 3/1999 | |
| EP | 1972462 | B1 | | 5/2011 | |
| EP | 3339052 | A1 | * | 6/2018 | B23P 19/04 |
| EP | 3521052 | A1 | * | 8/2019 | B42D 25/324 |
| WO | 2007048563 | A2 | | 5/2007 | |
| WO | 2007107235 | A1 | | 9/2007 | |
| WO | 2017102744 | A1 | | 6/2017 | |
| WO | WO-2019224159 | A1 | * | 11/2019 | B32B 37/025 |
| WO | WO-2021063542 | A1 | * | 4/2021 | B42D 25/29 |

* cited by examiner

SECURITY ELEMENT TRANSFER MATERIAL FOR TRANSFER, IN GOOD REGISTER, OF SECURITY ELEMENTS TO VALUE DOCUMENTS

BACKGROUND

The invention relates to a security element transfer material for the register-accurate transfer of security elements with a layered composite structure to a value document substrate, a method for manufacturing the security-element transfer material, a method for register-accurate transfer of security elements from the security element transfer material to a value document substrate, and value documents that are equipped in register-accurate manner with a security element while employing the security element transfer material.

Value documents such as banknotes, deeds, checks, identification documents or credit cards, in particular banknotes, are usually equipped with security elements which allow the authenticity of the value document to be checked and which at the same time serve as protection against unauthorized reproduction. The security elements employed for this are often not supplied individually, but in the form of transfer bands with a multiplicity of security elements configured as transfer elements. It is characteristic of transfer bands that the security elements are prepared on a carrier layer in the reverse order of the layers as they are later to be present on the value document to be protected.

The carrier layer is typically what is known as a temporary carrier, i.e. it is pulled off the layer structure of the security elements during the transfer. On the side opposite the carrier layer, the transfer bands have adhesive properties, which is usually achieved by applying a layer of heat-seal adhesive. The heat-seal adhesive melts during the transfer of the security elements and sticks the security elements with the value document or another object of value to be secured. The transfer band is placed with the heat-seal adhesive layer onto the object and pressed thereon by means of a heated transfer stamp or a transfer roller and transferred to the value document in the outline shape of the heated transfer stamp. Transfer elements, transfer bands and the transfer of transfer elements to target substrates are described, for example, in the publication EP 0 420 261 B1.

It is also known not to emboss security elements from the layered composite at the time of transfer to a value document substrate, but to punch them out of the layered composite and to pull off the surrounding layered composite material, i.e. to "weed" it, so that the security elements are present as individual patches on the temporary carrier material. The transfer then does not require a transfer device in the form of the security elements but can take place by means of a smooth transfer roller.

The security elements are transferred to value documents at high speed by bringing together and pressing together webs of transfer material and webs of value documents or sheets of value documents, each of which has a multiplicity of individual copies, wherein it is necessary to ensure that the security elements are applied to the correct location on each individual value document. For this purpose, register marks are required, which are read by a detector, so that the positions of the transfer material web and value document substrate web relative to one another can be suitably matched to one another during the entire transfer process on the basis of the transmitted signals. Register marks are typically colored prints with strongly light-absorbing inks or strongly light-reflecting prints that have a defined shape, such as, e.g., stripes or bar codes.

In the case of security elements which are embossed from the layer structure during the transfer process, the register exactness between the transfer material and the value document substrate when embossing the security elements can be set without any problems by means of register marks provided on the embossing foil adjacent to the security elements. However, in cases in which it is not possible or not desired to emboss the security elements from their layered composite, the transfer in exact register of the security elements to value document substrates poses a problem.

Embossing the security elements from their layer structure is always difficult when the layer structure is comparatively thick and/or contains layers that have the result that no clean separating edge is produced when a security element is embossed. Such layers are, for example, layers of highly crosslinked lacquers and of hard or brittle lacquers that do not break smoothly at the edge of the application tool during embossing, but instead break in an undefined manner. This can result in lacquer flakes, which, as disturbing impurities, impair the quality of the value documents and contaminate the machines employed, so that cleaning has to be carried out frequently. Such layers are also layers made of comparatively soft and elastic lacquers, which likewise do not break smoothly at the edge of the application tool when the security elements are embossed from their layered composite, but rather tend to tear in an undefined manner or to break incompletely, so that in extreme cases the security elements cannot be embossed from their layered composite at all.

It is completely impossible for the security elements to be embossed from their layered composite if the layer structure contains a foil layer. Such permanent carrier materials are absolutely necessary, for example, if the security elements would otherwise be too unstable or if the security elements are intended to close through openings in value documents. In such cases, the outlines of the security elements must be cut out of the layered composite structure and the layered composite material must be removed between the individual security elements. The required register marks then have to be applied to the temporary carrier material in a subsequent process step, however which does not solve the problem of register exactness, which is difficult to maintain, but merely shifts it: because the register exactness achieved when transferring the security elements to value document substrates now depends on the register exactness with which the register marks are applied to the temporary carrier material of the security elements.

SUMMARY

The object of the present invention is therefore to supply a security element transfer material which makes it possible to apply security elements to value document substrate webs or value document substrate sheets in exact register.

The object of the present invention is in particular to supply a security element transfer material that makes it possible to apply security elements in exact register to value document substrate webs or value document substrate sheets if the security elements contain one or several layers in their layer structure which make it difficult or impossible to transfer the security elements by separating them from the security element layered composite during the transfer process, such as, e.g., a foil layer or a lacquer layer which tends to break or tear in an undefined manner.

It is also an object of the present invention to supply methods for manufacturing such a security element transfer material, methods for transferring security elements from the security element transfer material to a value document substrate in exact register, and value documents which have been equipped with a security element in exact register while employing such a security element transfer material.

The objects are achieved by the security element transfer material, the method for manufacturing a security element transfer material, method for register-accurate transfer of security elements and by the value document, each of which having the features as specified in the independent claims. Embodiments of the invention are specified in the respective dependent claims.

The basic idea of the present invention is, in a security element transfer material, to separate the security elements from the layered composite already before the transfer process to a value document substrate and at the same time to determine the position of the required register marks. For this purpose, a starting material layered composite is manufactured which has the desired security element layer structure on a temporary carrier material, then the outline shapes of the desired security elements and outline shapes of register mark elements are incised into the layered composite material (with the exception of the temporary carrier material), and finally the layered composite material is pulled off the temporary carrier material outside the outline shapes of the security elements and the register mark elements, so that the security elements and the associated register mark elements are present as “islands” on the temporary carrier material. The register mark elements have the same or a similar layered composite structure as the security elements.

According to one embodiment of the invention, the outline shape of the register mark elements is chosen such that it corresponds to the contour of the desired register mark. In another embodiment of the invention, the register mark elements function as carrier elements for the register marks, which exactly define the position of the register marks, which can be necessary with more complex register marks, such as bar codes.

BRIEF DESCRIPTION OF THE DRAWINGS

The invention will hereinafter be described with reference to figures. It is pointed out that the figures are not true to proportion and not true to scale. Furthermore, features disclosed in connection with a specific figure are in no way to be understood in such a manner that the relevant features can only be applied in combination with the other features shown and/or described in the corresponding figure. Rather, features described in connection with a specific embodiment can each be combined independently with features from other embodiments or can be utilized very generally in the security element transfer material according to the invention. Incidentally, the security element transfer material, the method for manufacturing the security element transfer material, the method for register-accurate transfer of security elements to a value document substrate and the value document which has been equipped with a security element while employing the security element transfer material, represent different aspects of the same invention. Accordingly, any disclosure related to a particular aspect of the invention applies equally to the other aspects of the invention.

In the figures, the same reference numbers denote the same or corresponding elements. There are shown.

DETAILED DESCRIPTION OF VARIOUS EMBODIMENTS

Figure 1:
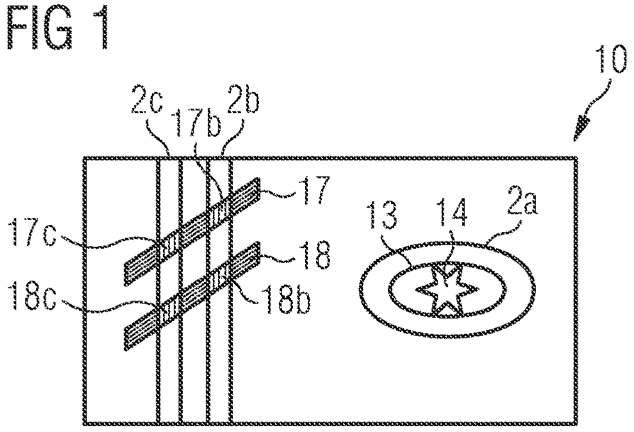
FIG. 1 a plan view of a value document with security elements transferred in exact register from a security element transfer material according to the invention, FIG. 2 and FIG. 3 plan views of security element transfer materials according to the invention, FIG. 4 to FIG. 6 process stages in the manufacture of a security element transfer material according to the invention, each represented in cross section along the line A-A' of FIG. 2, FIG. 7 and FIG. 8 process stages in the manufacture of an alternative security element transfer material according to the invention, each represented in cross section along the line A-A' of FIG. 2, FIG. 9 to FIG. 12 process stages of an alternative manufacturing method for a security element transfer material according to the invention, each represented in cross section along the line A-A' of FIG. 2, FIG. 13 a security element transfer material according to the invention, represented in cross section along the line A-A' of FIG. 2, with a composite material as the temporary carrier material, FIG. 14 the removal of the layered composite material outside the outline shapes of the security elements and the register mark elements from the temporary carrier material and the security elements and register mark elements remaining thereon, FIG. 15 and FIG. 16 process stages in the manufacture of a security element transfer material according to the invention, in which the register mark elements themselves represent register marks, FIG. 17 and FIG. 18 process stages in the manufacture of a security element transfer material according to the invention, in which the register mark elements function as carriers for register marks, FIG. 19 a plan view of a security element transfer material according to FIG. 14, FIG. 20 a plan view of a security element transfer material according to the invention analogous to FIG. 15, with alternative security elements, FIG. 21 a plan view of a section of a value document substrate web with a multiplicity of individual copies, FIG. 22 and FIG. 23 each a schematic representation of a transfer method of security elements from a security element transfer material according to the invention to a value document substrate.

FIG. 1 shows a value document 10 according to the invention in the form of a banknote in a plan view. The banknote 10 has three security elements, which were transferred from a security element transfer material according to the invention to the value document substrate in register-accurate manner, a foil patch **2*a* and two security strips 2*b* and 2*c*, wherein the security strips 2*b*, 2*c* form a group (repeat). The foil patch 2*a* has a somewhat larger area than an opening 13 in the value document that passes through the value document substrate and is covered and closed by the foil patch 2*a***.

The foil patch **2*a* shows, for example, a figurative representation, a color shift effect or any other desired effect (not represented in FIG. 1). In particular, the foil patch 2*a* has a see-through region 14, as can be produced, for example, by demetallizing a metallic layer. In the represented embodiment, the see-through region 14 is in the shape of a star, the points of which extend to the edge of the through hole 13 of the banknote. It is therefore substantial that the see-through region 10 of the foil patch 2***a* is placed precisely in the center of the through opening 13 for all banknotes 10.

The security strips 2*b* and 2*c* have printed regions 17*b*, 18*b*, or 17*c*, 18*c*, which complement line-shaped or bar-shaped, interrupted prints 17, 18 of the banknote 10 to form closed lines in each case. The security strips 2*b*, 2*c* must therefore be transferred precisely to the banknote substrate in such a manner that the imprints 17*b*, 18*b*, 17*c*, 18*c* are applied exactly in the interruptions in the lines 17, 18.

FIG. 1 represents oval and strip-shaped security elements, but the security elements can have any shape, including very complex outline shapes. Typical dimensions are in the range of about 5 mm at the narrowest point of a security element up to about 70 mm at the widest point of a security element or in the longitudinal direction of a security element. Typical thicknesses range from about 20 to 40 μm.

For precise, i.e. application in exact register or register-accurate application of security elements, register marks are required which have a precisely defined position in relation to the security element to be transferred, and with the aid of which the feeding of the security element transfer material relative to the value document substrate can be controlled in such a manner that each security element is applied to the specific location intended for it on the value document substrate.

Figure 2:
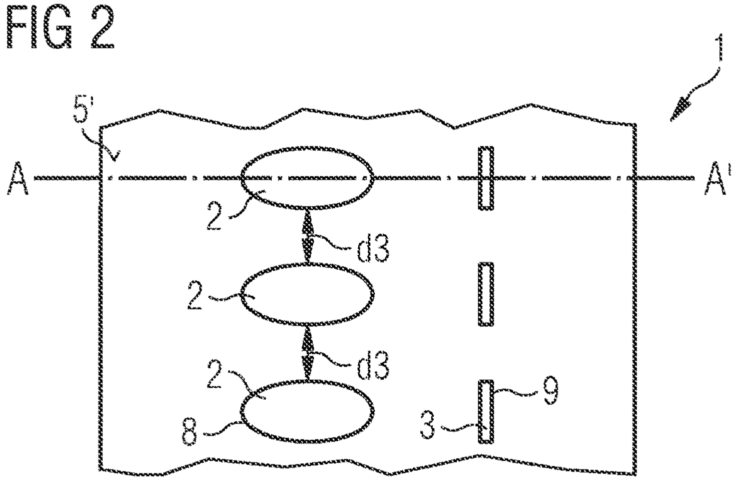
Figure 3:
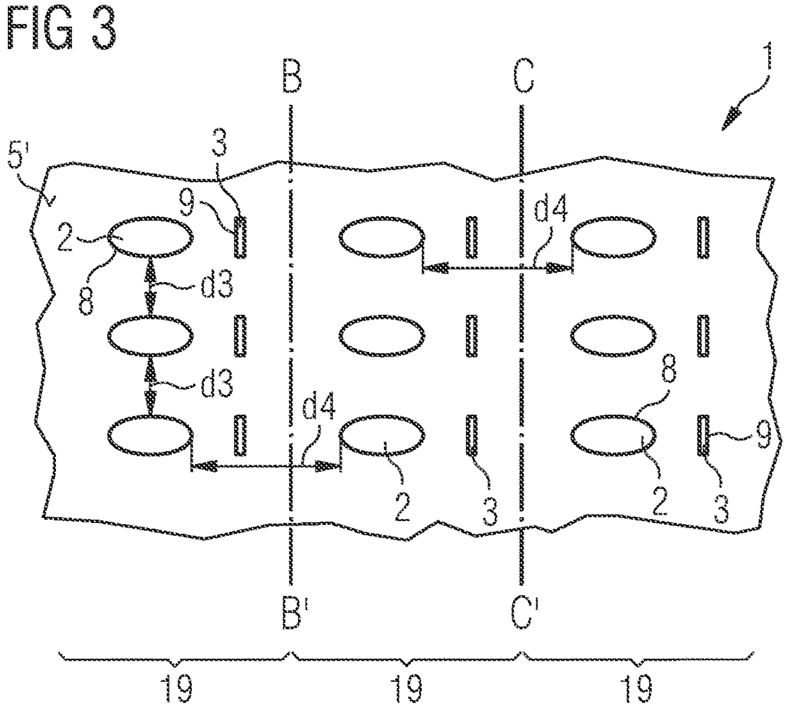

FIGS. 2 and 3 show sections of security element transfer materials 1 according to the invention with security elements 2 and register mark elements 3, wherein each security element 2 is assigned a register mark element 3. In the represented embodiments, the security element transfer material 1 is in each case an endless belt on which the security elements 2 and their associated register mark elements 3 are each arranged one behind the other. In the embodiment represented in FIG. 3, the security element transfer material belt 1 has several rows of security elements 2 with associated register mark elements 3 side by side. The manufacture of such security element transfer materials and their employment for transferring the security elements to value document substrates is described below.

Figure 4:
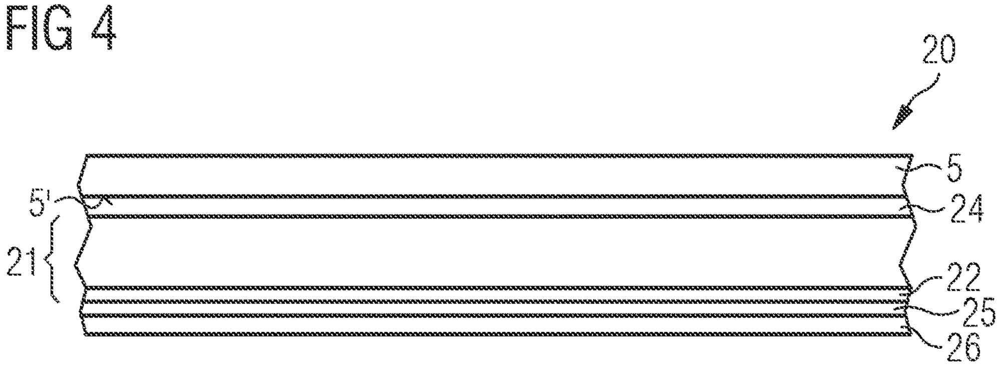
Figure 5:
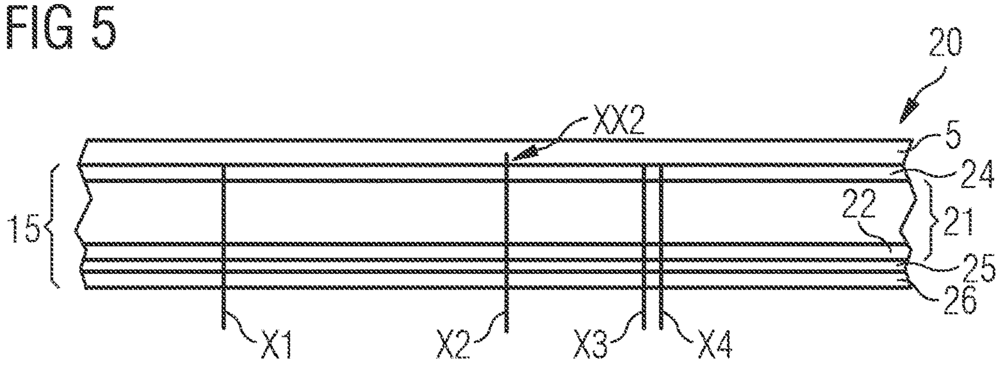
Figure 6:
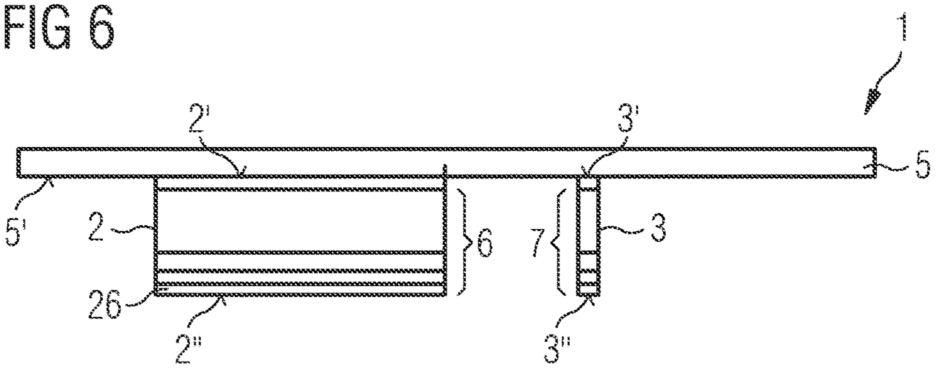

FIGS. 4 to 6 illustrate process stages in the manufacture of a security element transfer material 1 according to the invention, as represented in FIG. 2, each represented in cross section along the line A-A' of FIG. 2.

The security element transfer material 1 according to the invention is manufactured starting from a starting material layered composite 20, which is conventional per se and is composed of at least one temporary carrier material 5 and a functional layer structure 21 on a first surface or a first main area 5' of the temporary carrier material 5. The functional layer structure 21 must be detachable from the first main area 5' of the temporary carrier material 5, which is why a release layer 24 is preferably, but not necessarily, provided between the functional layer structure 21 and the temporary carrier material 5. On the main area of the functional layer structure 21 facing away from the temporary carrier material there is a heat-seal adhesive layer 26 or another layer which gives the later security elements adhesive properties for connection to a value document substrate. A primer or adhesion promoting layer 25 can be provided between the functional layer structure 21 and the layer accounting for adhesive properties 26.

In the embodiment represented in FIGS. 4 to 6, the functional layer structure 21 contains a permanent carrier material 22, which gives the security elements 2 formed therefrom stabilizing properties, so that they are suitable, for example, to close a through-opening in a value document, such as the through-opening 13 in the in banknote 10 represented in FIG. 1.

Preferred permanent carrier materials 22 are transparent or translucent foils, for example made of polyester, such as polyethylene terephthalate, of polyethylene or polypropylene. Through openings covered with transparent or translucent foils remain recognizable for a viewer. Such foils can also be employed as temporary carrier materials, but non-transparent or translucent foils are also suitable, and typical thicknesses of both the permanent and temporary carrier substrates range from about 4 to 20 μm. The materials that have been tried and tested in the field of security elements are preferably used for the heat-seal adhesive layer and the optional release layer and primer layer.

The functional layer structure 21 also includes feature layers, i.e. layers that have visually recognizable or machine-detectable features, such as metal layers, layers of metal effect inks, layers with color pigments or fluorescent pigments, liquid crystal layers, coatings with a color shift effect, layers with matte structures, such as disclosed e.g. in the publication WO 2007/107235 A1, printed colored motif layers, layer combinations, such as a layer with a color shift effect underlaid with a specific color, layers with magnetic pigments, etc.

The type and manufacture of the functional layers or the functional layer structure is fundamentally irrelevant for the present invention, and the present invention comprises security element transfer materials with security elements with any layered composite structure. However, the special advantages of the present invention come into play in particular when the security elements have a permanent carrier material 22, as represented in FIG. 4, and/or another layer that does not break smoothly or that tears during an application process by means of embossing.

Security elements for which the present invention is particularly suitable are, in particular, security elements which have a layer structure with numerous functional layers (feature layers), including a, for example, holographic security feature, ink-receiving, protective and laminating layers, ink layers, fluorescent prints, etc. Such security elements have, for example, a permanent carrier material, as represented in FIG. 4 to FIG. 6.

To manufacture a security element transfer material 1, as illustrated in FIG. 6, which has security elements 2 with permanent carrier material, the functional layer structure 21 can first be manufactured and then detachably connected to the temporary carrier material 5. Alternatively, the functional layer structure 21 can also be built up on the temporary carrier material 5.

The outline shapes of the security elements 2 and the register mark elements 3 are then incised into the resulting starting material layered composite 20, as illustrated in FIG. 5. The incisions each represent closed lines that define the outline shapes 8 of the security elements 2, i.e. the shape and area of the security elements 2, and the outline shapes 9 of the register mark elements 3, i.e. the shape and area of the register mark elements 3. Reference is made to the representations of FIG. 2 and FIG. 3. In the sectional view of FIG. 5, the incisions delimiting the security element 2 are denoted by X1, X2, and the incisions delimiting the register mark element 3 are denoted by X3, X4.

The incising of the outline shapes 8 of the security elements 2 and the outline shapes 9 of the register mark elements 3 is preferably carried out by means of a laser, since the best precision can be achieved in this manner. However, the term "cutting" here is generally to be understood as meaning all methods known to a person skilled in the art for separating the security elements and the register mark elements from the layered composite material surrounding them, for example stamping. If a laser is used for cutting, additional measures are preferably taken that are suitable for preventing deep cutting of the laser, in order to prevent damage to the temporary carrier material 5, which could lead to destabilization of the temporary carrier material 5 and, in the worst case, to tearing of the security element transfer material 1. Such an undesired deep cutting into the temporary carrier material 5 is indicated in FIG. 5 for the cutting line X2. The cutting line X2 only ends at the point XX2 in the temporary carrier material 5. Measures to protect against undesired deep cutting are explained in connection with FIG. 13.

After incising the outline shapes 8 of the security elements and the outline shapes 9, the layer 15 outside the outline shapes of the security elements and the register mark elements, that is, the entire layer structure on the temporary carrier material 5, which is located outside the outline shapes of the security elements and the register mark elements is pulled off the temporary carrier material 5. The result is the security element transfer material 1 represented in FIG. 6, on which the security elements 2 and the register mark elements 3 are present as isolated "islands" on the temporary carrier material 5. The security elements 2 have the layer structure 6, and the register mark elements 3 have the layer structure 7, wherein the layer structures 6, 7 are identical in the represented embodiment due to the manufacturing process. The security elements 2 adhere with their first main area 2' to the first main area 5' of the temporary carrier material 5, and have an opposite second main area 2" with adhesive properties, in the represented embodiment due to the heat-seal adhesive layer 26, since they are applied to a value document substrate with the second main area 2". Analogously, the register mark elements 3 have a first main area 3', with which they adhere to the temporary carrier material 5, and a second main area 3", which has adhesive properties. However, the register mark elements are not transferred to a value document substrate, which is why it is expedient to equip them with an anti-adhesive layer.

Otherwise, when transferring the security elements to a value-document substrate, care must be taken that suitable transfer conditions are created only for the security elements. With conventional transfer by heat sealing, this can be accomplished in a simple manner by applying pressure and heating only in the region of the security elements.

In the embodiment represented in FIG. 6, the security elements 2 and the register mark elements 3 have the same layer structure. However, the layer structures 6, 7 can also differ from one another. An example of different layer structures 6, 7 is illustrated in FIG. 7 and FIG. 8.

Figure 7:
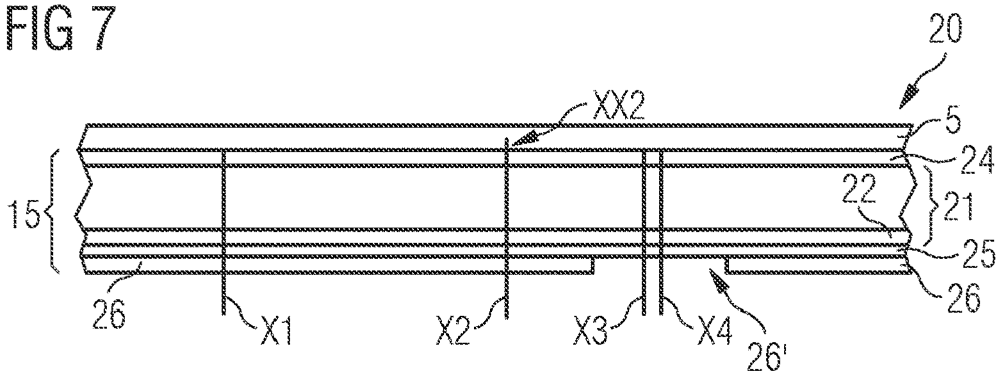
Figure 8:
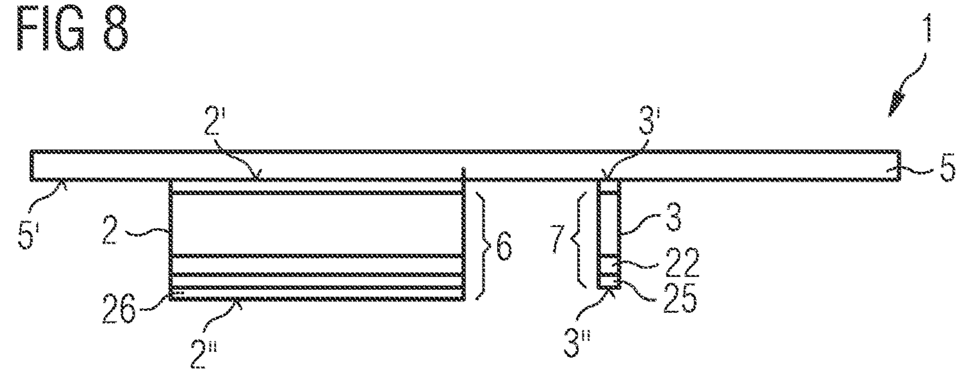
Figure 9:
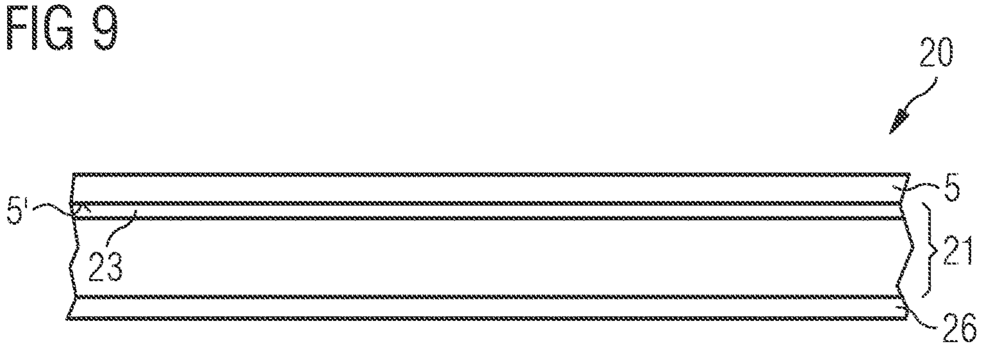

FIG. 7 and FIG. 8 are representations analogous to FIG. 5 and FIG. 6. Deviating from the layer structure represented in FIG. 5, however, in the layer structure represented in FIG. 7, the heat-seal adhesive layer 26 is not provided over the full area, but has gaps 26' in the places in which the outline shapes 9 of the register mark elements 3 are to be incised. The gaps 26' are advantageously somewhat larger than the register mark elements 3 to be formed, so that the outline shapes 9 are incised within the gaps 26' with a certain amount of play, as represented by the cutting lines X3 and X4 in FIG. 7.

After the layered composite material 15 has been pulled off the temporary carrier material 5, the security element transfer material 1 represented in FIG. 8 is created, in which the layer structure 6 of the security element 2 deviates from the layer structure 7 of the register mark element 3. Due to the absence of an adhesive layer, the register mark element 3 has no adhesive properties, which has the advantage that when the security elements 2 are transferred to a value document substrate, it is not necessary to ensure that only the security elements but not the register mark elements are transferred.

In the embodiment represented in FIG. 7 and FIG. 8, the primer layer 25 is formed over the full area. If the heat-seal adhesive layer 26 is left out in the region of the register mark elements 3 to be formed, the primer layer 25 can of course also have corresponding gaps, so that the layer structure 7 of the register mark element 3 has no primer layer 25 either. In general, it holds for the equality or similarity of the layer structures 6 of the security elements 2 and the layer structures 7 of the associated register mark elements 3 that the material costs for identical formation of security elements 2 and register mark elements 3 as well as a possible additional effort in the manufacture of different layer structures and a possible benefit from different layer structures need to be weighed against each other. If expensive materials are required to manufacture the security elements 2, such as magnetic inks, for example, or if embossings are required, for example for embossed holograms, but which are not required in the region of the register mark elements 3, these will rather not be provided in the region of the register mark elements, whereas in other cases the expenditure for the manufacture of a layered composite material 15 with locally varying composition can be disproportionately high.

The manufacture of a security element transfer material 1 according to the invention with security elements 2 without permanent carrier material is illustrated in FIG. 9 to FIG. 12.

First, a starting material layered composite 20 is manufactured, which, apart from the absence of the permanent carrier material 22, can be identical to the starting material layered composite 20 represented in FIG. 4. In the embodiment represented in FIG. 9, however, the starting material layered composite 20 consists only of a temporary carrier material 5, a functional layer structure 21 and a heat-seal adhesive layer 26. The functional layer structure 21 contains a brittle lacquer layer 23, for example a layer of a highly UV-crosslinked lacquer.

The starting material layered composite 20 is built up starting from the temporary carrier material on whose first main area 5' there are applied the feature layers and auxiliary layers of the functional layer structure 21 in the appropriate order (i.e. in the reverse order in which the layers are to be present later on the value document substrate) and finally the heat-seal adhesive layer 26.

As explained in connection with FIG. 4 to FIG. 6, the outline shapes of security elements 2 and register mark elements 3 are incised into the layered composite material on the temporary carrier material for example by means of a punching tool, by means of a cutting tool or by means of laser cutting. The layered composite material then has to be pulled off the temporary carrier material 5 outside the outline shapes of the security elements 2 and the register mark elements 3. However, if the functional layer structure 21 does not contain any stabilizing permanent carrier material, the layered composite material lacks sufficient stability. It would tear during pulling off.

Figure 10:
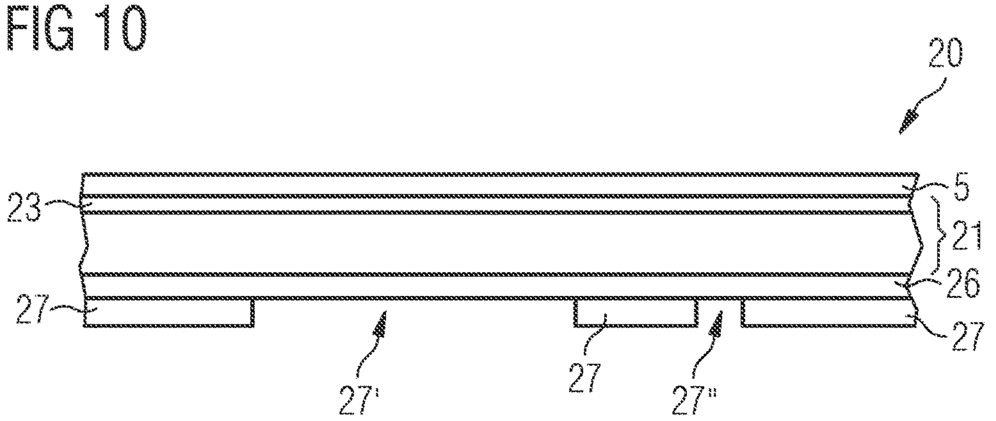
Figure 11:
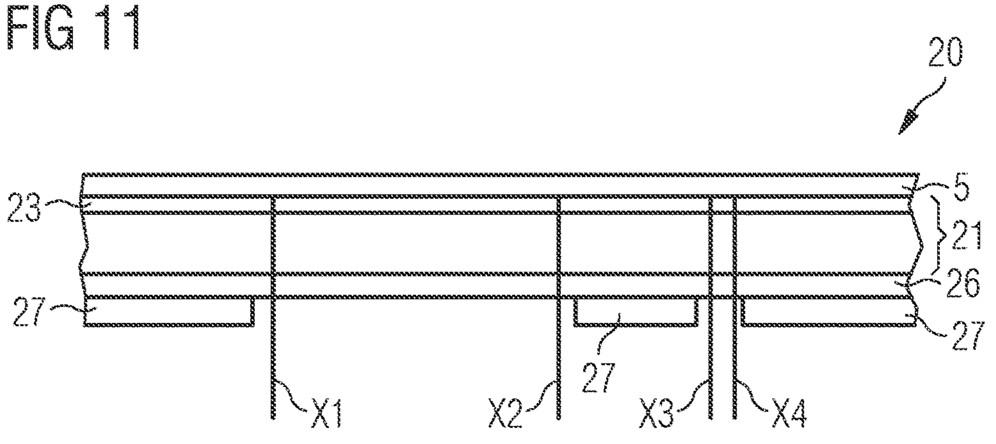

Therefore, the layered composite material is adhesively bonded at the free surface of the heat-seal adhesive layer with a release foil 27 which stabilizes the layered composite material sufficiently to allow it to be pulled off the temporary carrier material 5. A suitable release foil 27 is, for example, a hole mask, as represented in FIG. 10, which has gaps in the places in which the outline shapes 8 of the security elements 2 and the outline shapes 9 of the register mark elements 3 are to be incised. These gaps 27', 27" are advantageously somewhat larger than the security elements 2 and register mark elements 3 to be formed, i.e. the outline shapes 8, 9 are incised within the gaps 27', 27" with a certain amount of play, as represented by the cutting lines X1, X2, X3, X4 in FIG. 11.

Instead of a hole mask, a full-area release foil can also be employed. In such a case, it is expedient to apply a separate adhesive layer to the heat-seal adhesive layer 26 for adhesively bonding the release foil, wherein the places are left out where the outline shapes 8 of the security elements and the outline shapes 9 of the register mark elements are to be incised, i.e. the adhesive layer contains gaps as described for the hole mask 27. The full-area release foil is subsequently adhesively bonded and the outline shapes 8, 9 are incised into the layered composite material, wherein the release foil is also severed. In the regions without an additional adhesive layer, the non-bonded release foil can be easily removed, for example by blowing off. In contrast, the regions of the layered composite material bonded with the release foil 27 now have sufficient stability to be able to be pulled off the temporary carrier material 5.

A polyethylene terephthalate foil with a thickness of about 4 to 20 μm can be employed as the release foil, for example, but other materials and thicknesses are also suitable as long as the foil is sufficiently elastic and stable. A laminating adhesive is preferably employed to adhesively bond a full-area release foil.

Figure 12:
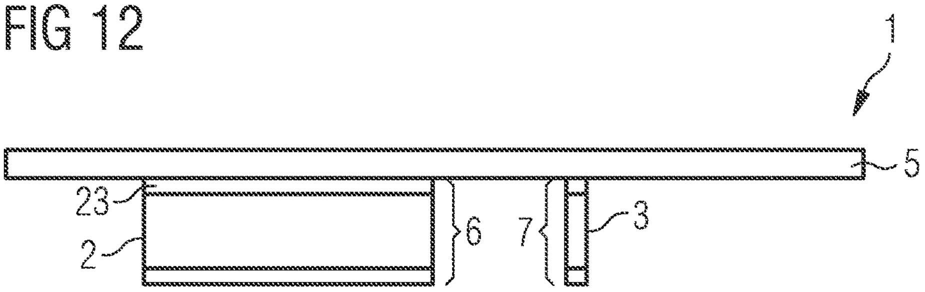

By pulling off the layered composite material outside the outline shapes 8, 9, the security element transfer material 1 represented in FIG. 12 with security elements 2 and register mark elements 3 is created, wherein the layered composite structure 6 of the security elements and the layered composite structure 7 of the register mark elements is identical in the represented embodiment. For the transfer of the security elements 2 to a value document substrate, the same applies as explained above for the security element transfer material 1 represented in FIG. 6.

However, the present invention is not limited to a security element transfer material with specific security elements.

In order to guarantee residue-free detachment outside the outline shapes of the security elements and the register mark elements, which is essential for the manufacture of high-quality security elements, the functional layer structure of the security elements must be completely severed, i.e. the cutting lines must extend to the temporary carrier material 5. On the other hand, the temporary carrier material 5 should not be cut in order to avoid destabilization. However, it is difficult to cut so precisely that the cuts end immediately on the first main area 5' of the temporary carrier material 5. After all, the layer structures to be severed and the carrier materials that are not to be severed are materials with thicknesses in the micrometer range. The security element layer structures typically have thicknesses in the range from about 20 μm to 30 μm and the temporary carrier materials typically have thicknesses in the range from 10 μm to 20 μm. It is therefore preferred to employ a temporary composite carrier material, which is composed of at least one first carrier substrate and one second carrier substrate, which are inseparably connected by means of an adhesive layer, instead of a single-layer temporary carrier material. In this context, inseparable means that the bond cannot be separated during the transfer process of the security elements or during any processing or treatment processes of the security element transfer material.

Transfer to objects of value usually takes place by a heat-sealing process, which is why thermoplastic adhesives are less suitable unless they have very high softening temperatures. Crosslinking adhesives, for example solvent-based 2K PU adhesives, are preferred. A starting material layered composite 20 with temporary carrier composite material 50 for manufacturing a security element transfer material 1 according to the invention is represented in FIG. 13.

Figure 13:
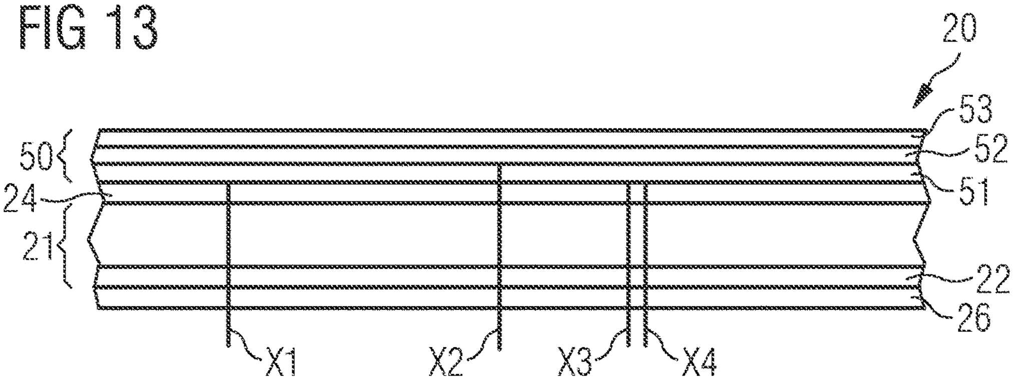

The starting material layered composite 20 represented in FIG. 13 has on the carrier composite material 50 a release layer 24, a functional layer structure 21 with permanent carrier material 22 and a heat-seal adhesive layer 26 in the specified order. Of course, additional layers can be present, or layers can be absent, such as e.g. the release layer 24 or the permanent carrier material 22. In the embodiment represented, the temporary carrier composite material is composed of the first temporary carrier substrate 51, the second temporary carrier substrate 53 and the adhesive layer 52 which adhesively bonds the two temporary carrier substrates.

The cut denoted by X2 in FIG. 13 severs the first temporary carrier substrate 51 completely. However, this severing does not lead to a destabilization of the temporary carrier composite material 50. Rather, the carrier composite material 50 with a completely severed first carrier substrate 51 is significantly more stable than a single-layer carrier material 5 of the same thickness, which is only slightly cut on the surface. This is due to the fact that plastic foils, such as those commonly employed as temporary carrier materials, have a high tear resistance, but only have little resistance to tear propagation. If they are slightly cut, they will continue to tear even under slight load, possibly to the point of tearing through completely. In the case of a composite material composed of at least two carrier substrates, as represented in FIG. 13, however, the second carrier substrate 53 remains completely intact and accordingly stable. Moreover, the adhesive layer 52 forms an additional “buffer zone” between the two temporary carrier substrates 51, 53.

A “self-healing” adhesive is preferably employed and the cutting of the outline shapes of the security elements 2 and the register mark elements 3 is carried out at a time when the adhesive has not yet fully cured. In this manner, cuts in the adhesive layer can be reformed. The adhesive, which is still plastic, can even penetrate cuts in the temporary carrier substrates and bond them at least to the extent that the stability of the cut temporary carrier substrates does not suffer significantly.

If the cutting is carried out by means of a laser, the second temporary carrier substrate 53 can also be protected by adding laser-absorbing or laser-reflecting substances, for example metal pigments, to the adhesive. However, the protective effect of laser-absorbing and laser-reflecting substances can also be made use of in the case of single-layer temporary carrier materials, for example by vapor-depositing a laser-absorbing or laser-reflecting substance on the first main area 5' of a temporary carrier material 5.

The temporary carrier composite material 50 can also have more than two temporary carrier substrates, wherein two temporary carrier substrates are each connected by means of an adhesive layer. However, preferably a layer thickness of about 70 μm for the entire carrier composite material 50 should not be exceeded. Preferred layer thicknesses are in the range from 20 μm to 40 μm.

Figure 14:
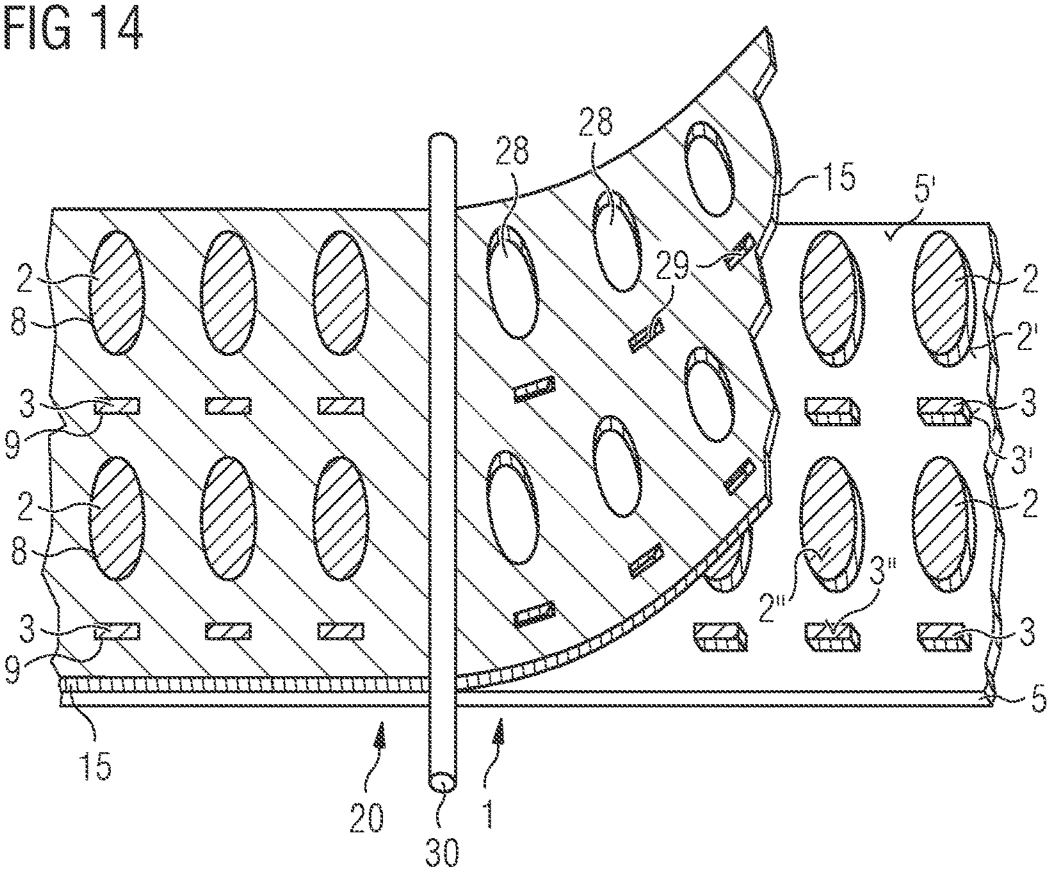

FIG. 14 illustrates the removal of the layered composite material 15 outside the outline shapes 8 of the security elements 2 and the outline shapes 9 of the register mark elements 3 from a temporary carrier material 5 and the security elements 2 and register mark elements 3 remaining on the temporary carrier material 5. Of course, with a carrier composite material 50, removal takes place in the same manner.

A starting material layered composite with incised outline shapes 8 of security elements 2 and outline shapes 9 of register mark elements 3 is fed to a separating roller 30 on which the temporary carrier material 5 and the layered composite material 15 are pulled apart. Since the incisions in the layered composite material 15, which define the outline shapes 8, 9, completely sever the layered composite material 15, the security elements 2 and the register mark elements 3 are not pulled off the temporary carrier 5 together with the layered composite material 15, but remain adhering on the first main area 5' of the temporary carrier material 5, while holes 28, 29 form in the corresponding places of the layered composite material. The resulting security element transfer material 1 has the security elements 2 and the register mark elements 3 assigned thereto, which are each detachably connected with their first main areas 2', 3' to the first main area 5' of the temporary carrier material 5. The second main areas 2", and possibly also the second main areas 3" have adhesive properties, so that the security elements 2 can be transferred to a value document substrate by means of a suitably positioned transfer roller.

Figure 15:
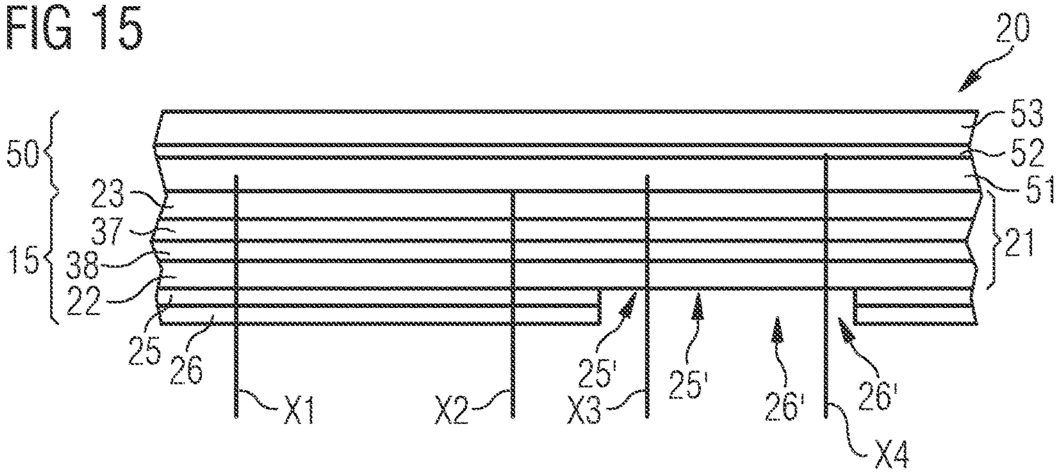
Figure 16:
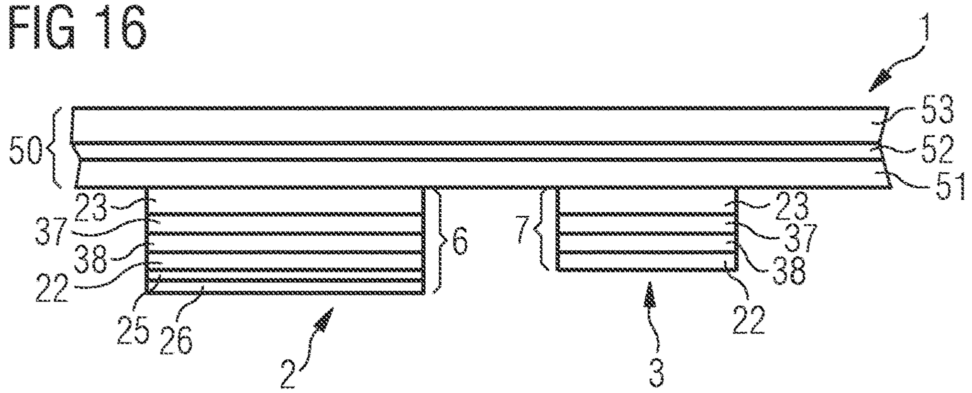
Figure 17:
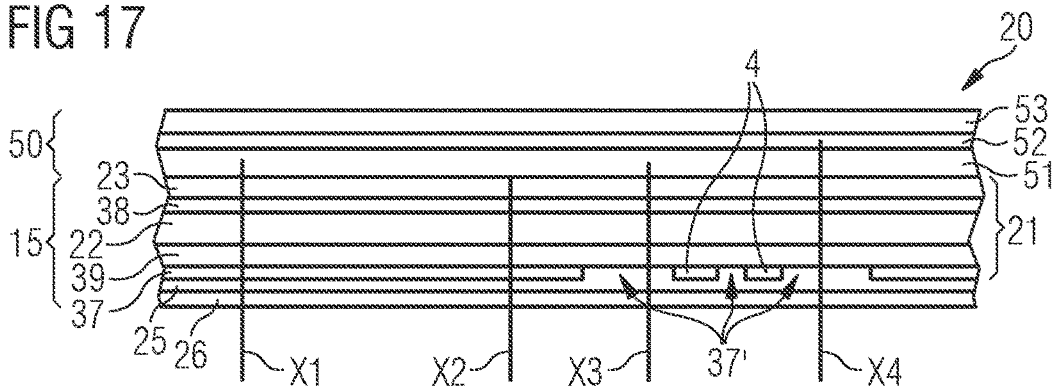
Figure 18:
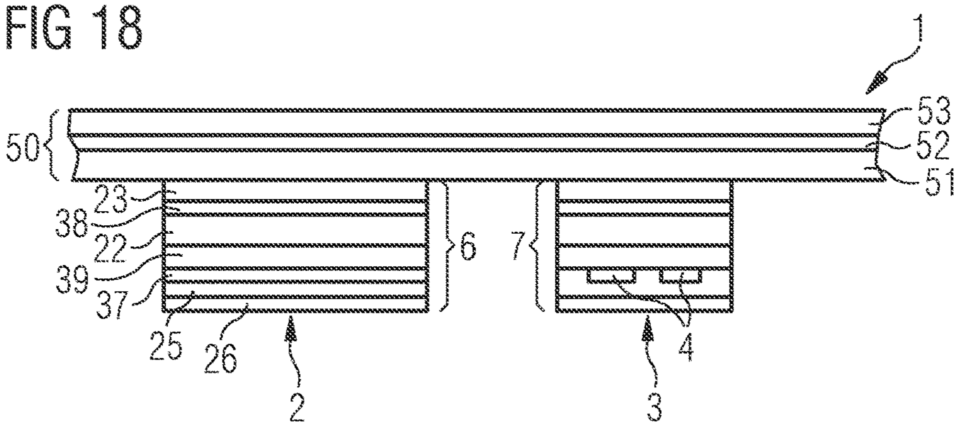

FIG. 15 to FIG. 18 are representations analogous to FIGS. 5, 6, as well as 7, 8 and 11, 12, wherein the register mark element 3 itself is a register mark in the embodiment represented in FIG. 16, while in the embodiment represented in FIG. 18 the register mark element 3 functions as a carrier for register marks 4. Exemplary simple layer structures are represented in each case.

In the embodiments represented in FIG. 15 to FIG. 18, the starting material layered composite 20 is composed of a temporary carrier composite material 50 and a layered composite material 15 into which the outline shapes of the security elements and register mark elements to be formed are incised. The temporary carrier material 50 is composed of a first carrier substrate 51 and a second carrier substrate 53 which are inseparably connected to one another by means of an adhesive layer 52. The layered composite structure 15 is composed of a functional layer structure 21, a (n optional) primer layer 25, and a layer 26 which gives the functional layer structure 21 adhesive properties. As has already been emphasized, the advantages of the present invention come into play particularly when the functional layer structure 21 contains a permanent carrier material and/or at least one layer that tends not to form smooth edges upon breaking, but rather to break or tear in an undefined manner.

The incisions in the layered composite material 15, which define the outline shapes of the security elements 2 and the register mark elements 3, are denoted by X1, X2, X3, X4 in FIG. 15 and FIG. 17. The incisions partially penetrate into the first carrier substrate 51, and partially even into the adhesive layer 52. The carrier composite material 50 remains sufficiently stable nonetheless, since the second carrier substrate 53 is not cut and the adhesive layer 52 can heal, as represented in FIG. 16 and FIG. 18. FIG. 16 and FIG. 18 show the state after pulling off the layered composite material 15 outside the outline shapes of the security elements and the register mark elements, i.e. the security element transfer material 1 according to the invention.

The security element transfer material 1 represented in FIG. 16 is manufactured from a starting material layered composite 20 with a functional layer structure 21, composed of a UV lacquer layer 23, a metallization 37, a laminating adhesive layer 38 and a PET foil 22, which are arranged on the temporary carrier composite material 50 in the specified order. The PET foil 22 is coated with a primer layer 25 and a heat-seal adhesive layer 26. In the region of the register mark element 3 to be formed, the primer layer 25 has a gap 25' and the heat-seal adhesive layer 26 has a gap 26', as represented in FIG. 15. The layered material 15 therefore varies in terms of its layer structure over the area of the starting material layered composite.

After pulling off the layered composite material 15 from the temporary carrier material 50, a security element transfer material 1 (FIG. 16) is obtained, in which the layer structure 7 of the register mark elements 3 differs from the layer structure 6 of the security elements 2, but wherein the functional layers (layer structure 21) are identical. In the embodiment represented, the metallization 37 of the register mark element 3 forms the actual register mark 4. Since the metallization extends over the full area of the register mark element, the register mark element is referred to as a register mark in this case.

The security element transfer material 1 represented in FIG. 18 is manufactured from a starting material layered composite 20 with a functional layer structure 21, composed of a UV lacquer layer 23, a laminating adhesive layer 38, a PET foil 22, a further UV lacquer layer 39 and a metallization 37, which are arranged on a carrier composite material 50 in the specified order. The metallization is coated with a primer layer 25 and a heat-seal adhesive layer 26. In this embodiment, the primer layer 25 and the heat-seal adhesive layer 26 are formed over the full area, as represented in FIG. 17.

Deviating from the embodiments illustrated in the previous figures, in this embodiment the register mark elements 3 are not register marks themselves but act as carriers for register marks 4. Register marks 4 in or on register mark elements 3 can be manufactured in various ways, for example by demetallizing metal layers using a so-called washing ink. Such a method is described in the publication EP 1 972 462 B1. To produce the register marks 4 in the starting material layered composite represented in FIG. 17, the washing ink is applied to the UV lacquer layer 39 prior to applying the metal layer in the places where the metal layer 37 is to be removed. The metal layer can then be removed in the corresponding places together with the washing ink, wherein the gaps 37' are formed in the metal layer 37. The register marks 4 then remain e g as strip-shaped metallic regions within a demetallized region.

After the layered composite material 15 has been pulled off the temporary carrier material 50, the security element transfer material 1 represented in FIG. 18 is obtained, in which the register mark elements 3 are carriers for register marks 4. The layer structure 7 of the register mark elements 3 can also differ from the functional layer structure of the security elements 2, for example, in that the UV lacquer layer 39 in the region of the security elements 2 is equipped with an embossed structure in order to produce an embossed hologram together with the metallization 37.

An alternative functional layer structure 21, not shown here, is composed, like the structure shown in FIG. 18, of a UV lacquer layer 23, a laminating adhesive layer 38 and a PET foil 22, on which a further laminating adhesive layer, a metallization and a further UV lacquer layer are arranged in this order. For this purpose, the layer structure composed of metallization and additional UV lacquer layer was transferred (prior to coating with a primer layer 25 and a heat-seal adhesive layer 26) to the PET foil 22, for example via an additional temporary carrier material. In this embodiment, the additional UV lacquer layer is correspondingly supplied with the primer layer 25 and the heat-seal adhesive layer.

In the embodiments represented in FIG. 15 to FIG. 18, the register mark elements 3 or the register marks 4 are composed of metalized regions. However, register marks are by no means limited to metallized regions. For example, prints of strongly light-reflecting materials, embossings, patterns produced by laser or light-transmissive regions of a specific contour, such as demetallizations (clear text) within a metallized region, are also possible. Bars are often chosen as the register mark contour, for example bars with a width of 3 mm, but the register marks 4 are not restricted in any particular way with regard to their type and shape. What is substantial is only that they are attached in a place that ensures that they can be easily detected.

An additional work step is required for the production of register marks 4, the contours of which are not identical to the outline shape of a register mark element 3, but for which a register mark element 3 serves as a carrier. However, the problem of a register inaccuracy when producing the register marks 4 does not arise, since the register marks 4 are produced before the layered composite material 15 is pulled off the temporary carrier material outside the outline shapes of the security elements 2 and the register mark elements 3. It is therefore possible to produce register marks with larger dimensions than are required. The excess regions are also removed when the layered composite material 15 is pulled off, as indicated by the dashed lines in FIG. 19. Register marks 4 remain on the temporary carrier material 5, the dimensions of which are predetermined by the outline shape of the register mark elements 3 carrying them.

Figure 19:
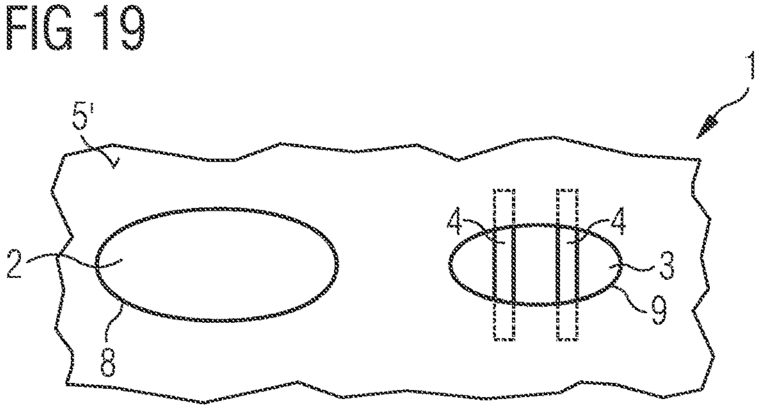

FIG. 19 shows a plan view of a security element transfer material 1 according to the invention, as represented in cross section in FIG. 18. To the first main area 5' of the temporary carrier material 5 there is detachably connected a security element 2, the shape and area of which is defined by the incised outline shape 8, such as the foil patch 2*a* represented in FIG. 1. The associated register marks 4 ensure that the foil patch is transferred to a value document substrate in exact register.

Figure 20:
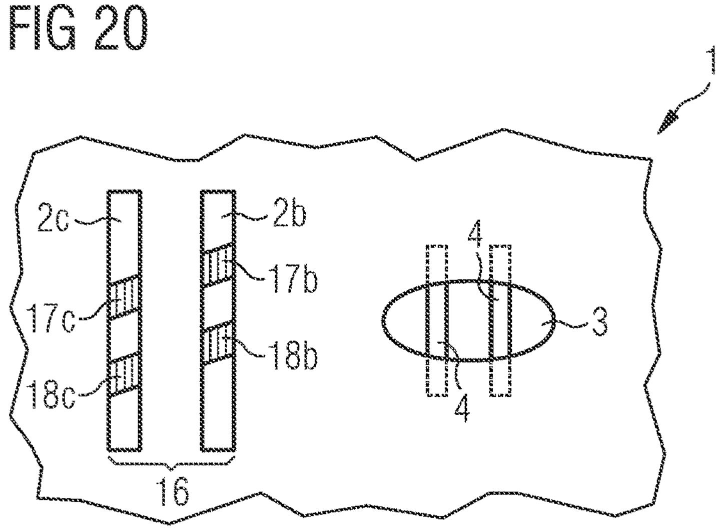

FIG. 20 is a representation like in FIG. 19, wherein the register marks 4 here guarantee the transfer in exact register of a group 16 of security elements. In the embodiment represented, the security elements are security strips like the security strips 2*b*, 2*c* represented in FIG. 1 with the printed regions 17*b*, 18*b*, 17*c*, 18*c*, which complement prints on the value document substrate to form bars 17, 18.

When manufacturing a value document as represented in FIG. 1, in practice one set of register marks 4 would be sufficient for transfer in exact register of all security elements 2*a*, 2*b*, 2*c* if the security elements 2*a*, 2*b*, 2*c* are formed on the same temporary carrier material 5. In this case, the foil patch 2*a* on the temporary carrier material would have to be at the same distance from the security strips 2*b*, 2*c* as it should be on the value document 10. In addition, the security strips 2*b*, 2*c* would have the same layered composite structure as the foil patch 2*a*.

Figure 21:
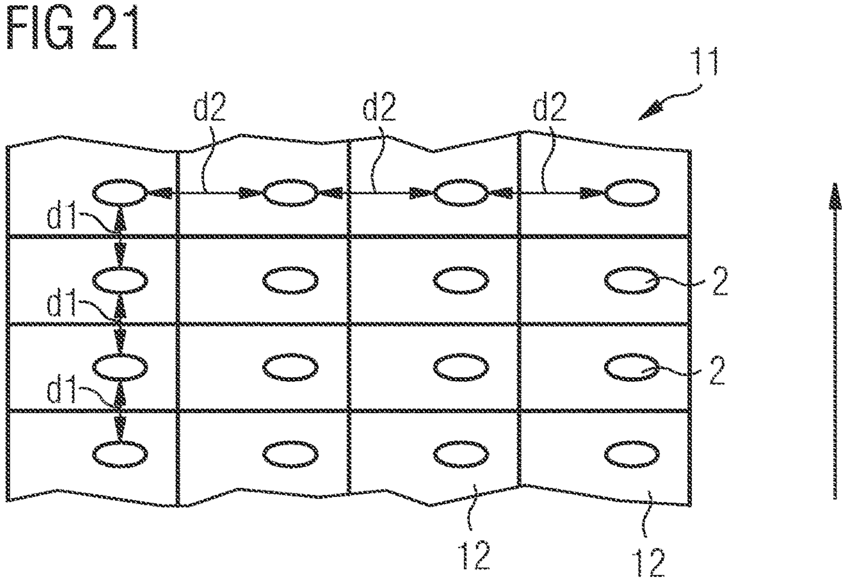

FIG. 21 shows a plan view of a section of a value document substrate web 11 with a plurality of individual copies 12, for example banknotes, immediately after the transfer of security elements 2. The value document substrate web represented has four individual copies 12 next to one another, but the number of individual copies arranged next to one another can be substantially higher. During the transfer of the security elements, the value-document substrate web 11 is transported in a direction that is indicated by the arrow in FIG. 21. The security elements 2 have a distance d1 from one another in the transport direction and a distance d2 from one another transversely to the transport direction. Accordingly, the security elements on the security element transfer material 1 must in principle have the same distances from one another, i.e. distances d1 in the transport direction and distances d2 transversely to the transport direction.

In order to save space and to avoid having to laboriously manufacture large area regions of costly layered composite material, most of which is not employed but discarded, namely the entire region outside the outline shapes 8 of the security elements 2 and the outline shapes 9 of the register mark elements 3 (see FIG. 14), the security elements in the security element transfer material 1 are formed at the smallest possible distance from one another in the transport direction. The differences in the distances between the security elements 2 on the security element transfer material 1 on the one hand and on the value document substrate 11 on the other hand can be compensated for in the transport direction by different transport speeds of the security element transfer material webs and the value document substrate webs during the application of the security elements. The register marks 4 ensure that the application is in exact register.

Transverse to the transport direction, different distances between the security elements on the security element transfer material on the one hand and the value document substrate 11 on the other hand cannot be compensated for by different transport speeds. The security elements on the security element transfer material 1 must therefore have the same distances d2 from one another in the transverse direction as they should have after the transfer to a value-document substrate web 11. Corresponding arrangements are represented in FIG. 2 and FIG. 3 in a plan view of the first main areas 5' of temporary carrier materials of security element transfer materials 1.

In the transport direction, the security elements 2 each have short distances d3 (d3<d1). In the embodiment represented in FIG. 3, the distances d4 of the security elements transverse to the transport direction during application are also smaller than the distances that the security elements should have from one another after their application to a value document substrate web with a multiplicity of individual copies arranged next to one another (d4<d2). Therefore, prior to employment, the transfer belt represented in FIG. 3 is cut into transfer bands 19, as indicated by the lines B-B' and C-C'. The correct positioning during the transfer of the security elements is secured by the register mark elements 3, which themselves represent register marks in the represented embodiment.

Figure 22:
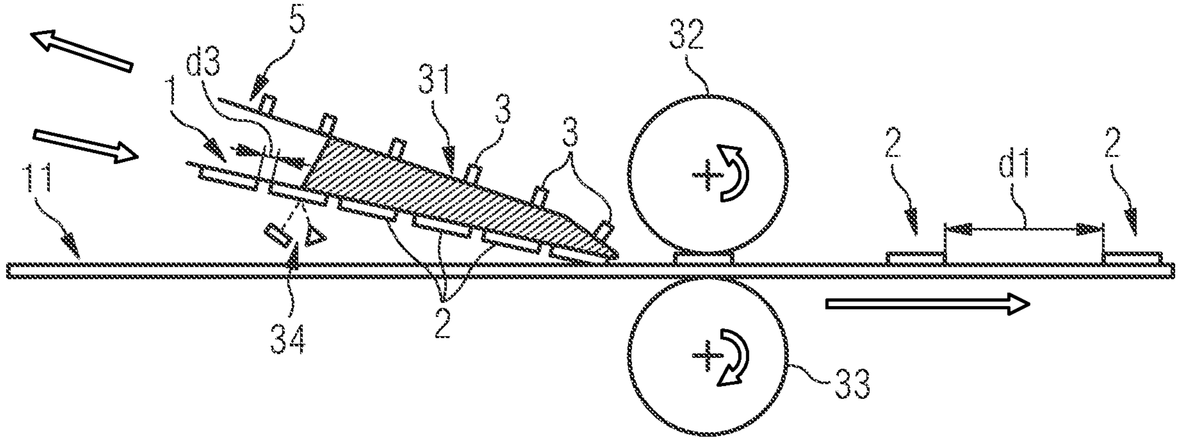
Figure 23:
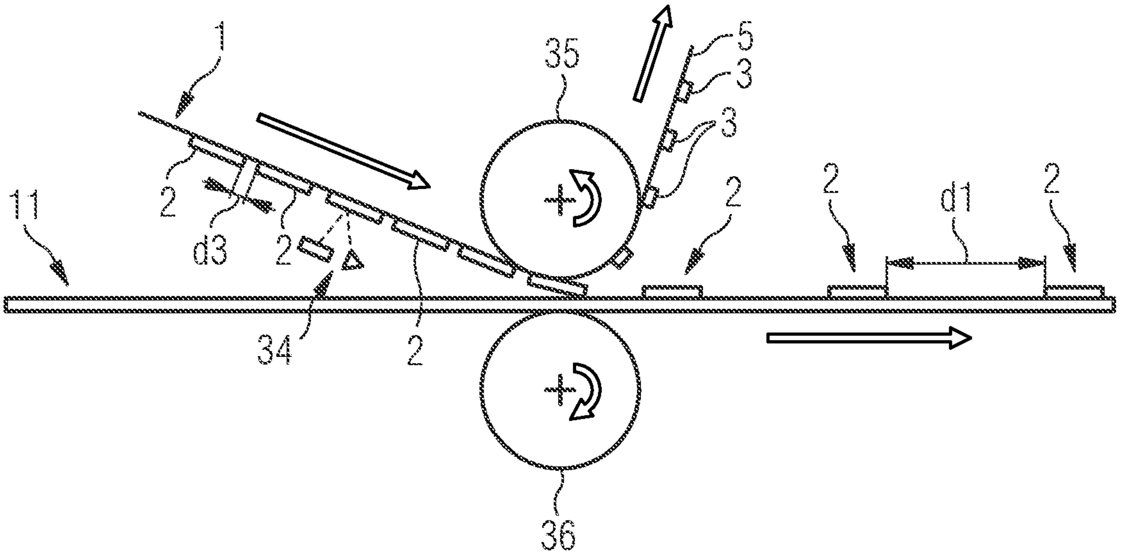

The process of transferring security elements 2 from security element transfer materials 1 according to the invention to value document substrates 11 is represented schematically in FIG. 22 and FIG. 23. Both the security element transfer materials 1 and the value document substrates 11 are used in the form of endless webs. The arrows each illustrate the transport directions of security-element transfer material webs and value document substrate webs. On the security element transfer materials 1, the security elements 2 and their associated register mark elements 3 have short distances d3 from one another in the transport direction. In the representation of FIG. 22 and FIG. 23 the register mark elements 3 are concealed by the security elements 2. The register mark elements 3 or the register marks 4 are, however, detected by the detectors 34 and the transport speeds of the security-element transfer material web and the value document substrate web are matched to one another on the basis of the measured signals in such a manner that the security elements 2 are applied in exact register and, after their application to the value document substrate web 11 have the distances d1 from each other in the transport direction.

In the application method represented in FIG. 22, the security element transfer material 1 is guided over an application wedge 31, at the tip of which the security elements 2 are detached and subsequently fixed on the value document substrate web 11 by a calendar roller 32 with associated counter-pressure roller 33. The register mark elements 3 remain on the temporary carrier material 5. They are now visible in the representation. In the application method represented in FIG. 23, the security element transfer material 1 is guided together with a value document substrate 11 between an application roller 35 and a counter-pressure roller 36 and the security elements 2 are thereby applied to the value document substrate web. The application device in the form of the application roller 35 and the counter-pressure roller 36 only exerts pressure on the security elements 2, but not on the register mark elements 3, which is why the register mark elements 3 are not transferred to the value document substrate 11 but remain on the temporary carrier material 5 and are transported away with it. If the second main areas 3" of the register mark elements 3 have no adhesive properties, the application roller 35 and the counter-pressure roller 36 can also exert pressure over the full area.

Value document substrates can be paper or polymer substrates or also paper/polymer composite substrates. The term "value document" is not necessarily to be understood in such a manner that it already has to be a value document in a form fit for circulation. Rather, the term within the meaning of the present invention includes every preliminary stage on the way to the manufacture of a value document, for example so-called "security paper", which only has some of the features of the later value document. The transfer of a security element from the security element transfer material according to the invention to the value document substrate can be, for example, the first step in the manufacture of a value document. Value documents within the meaning of the present invention are in particular banknotes, certificates, checks, identification documents, identification cards and credit cards, but also other documents whose unique identification is to be ensured and which are to be protected against forgery.

The invention claimed is:

1. A security element transfer material for the register-accurate transfer of security elements with a layered composite structure onto a value document substrate, having:

a temporary carrier material with a first main area, a plurality of security elements with a layered composite structure of a layered composite material and with a first main area and an opposite second main area, wherein each security element is detachably connected on its first main area to the first main area of the temporary carrier material, and wherein the second main area of each security element has adhesive properties for application to the value document substrate, a plurality of register mark elements which have a layered composite structure and which are connected with their first main areas to the first main area of the temporary carrier material, each register mark element represents a register mark or contains a register mark and has a second main area that is anti-adhesive, a security element or a group of at least two security elements is assigned at least one register mark in each case, and the temporary carrier material has no layered composite material on its first main area, apart from the security elements and the register mark elements.

2. The security element transfer material according to claim 1, wherein the register mark elements themselves respectively represent register marks due to their outline shape or are carriers of register marks, the position and dimensions of which determine the position of the register marks.

3. The security element transfer material according to claim 1, wherein the register marks can be detected by means of a light transmission detector or by means of a light reflection detector.

4. The security element transfer material according to claim 1, wherein the security-element layered composite structure has a foil layer and/or a lacquer layer.

5. The security element transfer material according to claim 1, wherein the temporary carrier material is a carrier composite material which has at least one first carrier substrate and one second carrier substrate which are inseparably interconnected by means of an adhesive layer.

6. The security element transfer material according to claim 1, wherein the security element transfer material is an endless belt on which the security elements are arranged one behind the other in the longitudinal direction and optionally also next to one another in the transverse direction, wherein the distance of the security elements from one another in the longitudinal direction is the same as or smaller than the distance that the security elements have after their application to a value-document substrate, and optionally the distance of the security elements from one another in the transverse direction is the same as the distance that the security elements have after their application to a value-document substrate.

7. A method for manufacturing a security element transfer material with a plurality of security elements of a layered composite material and with a plurality of register marks which allow a register-accurate transfer of the security elements to a value document substrate, having the following steps of:

supplying a temporary carrier material with a first main area, building up a layered composite material on the first main area of the temporary carrier material to manufacture a starting material layered composite, incising outline shapes of the security elements and outline shapes of register mark elements into the starting material layered composite, wherein the register mark elements represent register marks or contain register marks and have a main area that is anti-adhesive, and removing the layered composite material outside the outline shapes of the security elements and the register mark elements, so that the security elements and the register mark elements are the only regions on the first main area of the temporary carrier material to which layered composite material adheres.

8. The method according to claim 7, wherein register marks are produced in the register mark elements prior to removing the layered composite material outside the outline shapes of the security elements and the register mark elements, and prior to incising the outline shapes of the security elements and the register mark elements into the starting material layered composite.

9. The method according to claim 7, wherein to remove the layered composite material outside the outline shapes of the security elements and the register mark elements, the layered composite material is adhesively bonded to a release foil in the regions to be removed on its main area that is not connected to the temporary carrier material, and the regions of the layered composite material to be removed are pulled off the temporary carrier material together with the release foil.

10. The method according to claim 7, wherein the temporary carrier material is a temporary carrier composite material, and the supplying of the temporary carrier material comprises manufacturing the temporary carrier material, wherein the temporary carrier material is manufactured by inseparably connecting at least one first carrier substrate and one second carrier substrate by means of an adhesive layer to form the temporary carrier composite material.

11. A method for manufacturing a security element transfer material with a plurality of security elements of a layered composite material and with a plurality of register marks which allow a register-accurate transfer of the security elements to a value document substrate, having the following steps of:

supplying a temporary carrier material with a first main area, manufacturing a layered composite material, wherein one of the layers of the layered composite material is a foil layer, connecting the layered composite material to the first main area of the temporary carrier material to manufacture a starting material layered composite, incising outline shapes of the security elements and outline shapes of register mark elements into the starting material layered composite, wherein the register mark elements represent register marks or contain register marks and have a main area that is anti-adhesive and removing the layered composite material outside the outline shapes of the security elements and the register mark elements, so that the security elements and the register mark elements are the only regions on the first main area of the temporary carrier material to which layered composite material adheres.

12. The method according to claim 11, wherein register marks are produced in the register mark elements prior to removing the layered composite material outside the outline shapes of the security elements and the register mark elements, and prior to incising the outline shapes of the security elements and the register mark elements into the starting material layered composite.

13. The method according to claim 11, wherein to remove the layered composite material outside the outline shapes of the security elements and the register mark elements, the layered composite material is adhesively bonded to a release foil in the regions to be removed on its main area that is not connected to the temporary carrier material, and the regions of the layered composite material to be removed are pulled off the temporary carrier material together with the release foil.

14. The method according to claim 11, wherein the temporary carrier material is a temporary carrier composite material, and the supplying of the temporary carrier material comprises manufacturing the temporary carrier material.

15. A method for register-accurate transfer of security elements with a layered composite structure from a security element transfer material to a value-document substrate, wherein the security element transfer material includes a temporary carrier material with a first main area, and a plurality of security elements with a layered composite structure of a layered composite material and with a first main area and an opposite second main area, wherein each security element is detachably connected on its first main area to the first main area of the temporary carrier material, wherein the second main area of each security element has adhesive properties for application to the value document substrate, wherein the security element transfer material further includes a plurality of register mark elements which have a layered composite structure and which are connected with their first main areas to the first main area of the temporary carrier material, wherein each register mark element represents a register mark or contains a register mark and has a second main area that is non-adhesive or anti-adhesive, and wherein the security element transfer material further includes a security element or a group of at least two security elements is assigned at least one register mark in each case, and the temporary carrier material has no layered composite material on its first main area, apart from the security elements and the register mark elements;

the method comprising the following steps of:

guiding together the security element transfer material and the value document substrate, detecting the register marks of the security element transfer material and guiding together in register-accurate manner the security element transfer material and the value document substrate, compressing the security element transfer material at least in the region of the security element to be transferred or the security elements to be transferred and the value document substrate, optionally at elevated temperature, and separating the temporary carrier material with the register mark elements from the transferred security elements.

16. A value document which was equipped with a security element while employing a security element transfer material according to claim 1.

17. The value document according to claim 16, wherein it is a security paper or a banknote.

* * * * *